INVENTOR.
RALPH C. MORRIS
BY FOWLER, KNOBBE
& GAMBRELL
ATTORNEYS.

Sept. 13, 1966  R. C. MORRIS  3,271,867
COMBINATION LAYOUT TOOL
Filed Sept. 30, 1964  2 Sheets-Sheet 2

INVENTOR.
RALPH C. MORRIS
BY FOWLER, KNOBBE
& GAMBRELL
ATTORNEYS.

United States Patent Office 3,271,867
Patented Sept. 13, 1966

3,271,867
COMBINATION LAYOUT TOOL
Ralph C. Morris, 1572 Hazelwood Ave.,
Los Angeles, Calif.
Filed Sept. 30, 1964, Ser. No. 400,344
5 Claims. (Cl. 33—94)

This invention relates to a combination layout tool and, more particularly, to a tool for developing patterns for various fittings used in sheet metal work.

The sheet metal benchman is a skilled artisan who is called upon during the course of this work to develop patterns for many different types of fittings. While relatively simple layout tools can be used to develop straight ducts of similar blocked-out materials, when layouts must be made of the more sophisticated fittings such as round elbows, roof jacks, transition elbows and the like, it is necessary for a benchman to have a variety of tools at his disposal. Intricate development layouts not only require a tool which will permit parallel and perpendicular lines to be drawn, but one which can be used to scribe series of parallel or acute angle lines, space rivet locations, measure angles, scribe arcs and permit the bisection of angles.

In accordance with these requirements, the present invention permits a benchman to readily and efficiently mark, measure and scribe the variety of complex layouts needed for sheet metal fittings and ducts to meet the requirements of modern industry.

The present layout tool consists essentially of a T-square, a radius arm pivotally supported for movement intermediate the arms of the T, an auxiliary square slideably and rotatably mounted on the arm and a slideable scribing device disposed between the auxiliary square and the support point for the radius arm.

The T-square part of the tool has a guide shoulder which rests against an edge of the sheet metal upon which a cutter or benchman is developing his pattern. Both arms of the T have a series of scales scribed on them to permit distances to be marked off and also to permit layouts by triangulation methods.

The radius arm is pivoted at the junction of the arms of the T and indexed to permit a readout of the angle between the radius arm and an arm of the T.

The scribe or trammel is slideably but non-rotatably supported on the radius arm to permit arcs of different radii to be scribed on the work primarily between the arms of the T.

The auxiliary square is substantially smaller than the arms of the T. It is rotatable with respect to the radius arm and slideable therealong. A series of scales are provided on the auxiliary square as well as a protractor and a series of notches to space out rivet holes or other points. Inasmuch as the arms of the auxiliary square are substantially shorter than those of the T-square, it is possible to manipulate and use the auxiliary square at points relatively close to the apex of the T-square.

The present combination tool has a variety of additional features which facilitate the forming of pattern designs by benchmen or cutters.

One feature is a series of spaced-apart slots in one or both of the T-square arms to permit scribe lines that fall under the arms to be seen as the tool is used subsequently.

Another feature pertains to a right angular slot which terminates adjacent the shoulder provided on the base arm of the T-square so that any scribe lines may be extended to the edge of the sheet metal upon which a layout is being made. Moreover, a series of vertically spaced markings on each end of the guide arm of the T-square are provided so that a flange or overlap of preselected width can be provided during the course of a pattern layout.

Another feature of the combination layout tool resides in providing spaced-apart apertures along at least one arm of the T-square to facilitate marking a series of spaced-apart points.

Yet another feature resides in indexing the angular rotation of the radius arm to permit selection of a desired acute angle between the radius arm and an arm of the T-square.

Still another feature is the provision of a scale along the upper edge of the radius arm to permit distances between the auxiliary scale, the scribe and the point of attachment of the radius arm to be preset.

Still other features are built into the smaller auxiliary square which can be rotated with respect to the radius arm and moved radially therealong. For example, the auxiliary square provides a series of scales on the outer edges of its arms, a protractor on one of its arms and a series of one-fourth inch notches on an arm to permit marking off spacings for rivets, screws or the like.

Another feature of the auxiliary scale is a slot formed at one end of the auxiliary scale at a 45° angle to the parallel edges of the arm to permit bisecting lines to be scribed simply on the sheet metal.

In its broader aspects, the combination layout tool of the present invention combines a right angle member having a pair of inner scaled straight edges, a compass arm pivotally mounted at the junction of the edges of the right angle member and an auxiliary member having two degrees of freedom associated with the arm.

In a more limited sense, the multi-purpose layout tool of the present invention combines a T-square, a compass arm pivotally connected to the T-square, marking means slideably mounted at the free end of the compass arm and proportioned to permit it to be used relatively close to the pivotal connection for the compass arm, and means operable to hold the compass arm, the square and the marking means in preselected positions with respect to the T-square.

More narrowly, the combination layout tool combines a base member, an upright arm perpendicularly and integrally mounted on the base member to form a first square, a rotating arm member pivotally mounted coincident with the intersection of the base member and upright arm, a second relatively small square slideably but non-rotatably mounted on the rotating arm, a plurality of scale indicia scribed on the arm member, the base member and the arms of the relatively small square, means to read out the interior angles between the rotating arm member and the base member, marking means slideable on the rotating arm for positioning at different scale positions along the rotating arm intermediate the first and second squares, guide means associated with the first square to move it along a work piece and a measuring aperture formed in the base member directly adjacent the upright arm member and extending across the base member to the guide means.

These and other objects and features may be more fully understood when the following detailed description is read with reference to the drawings in which.

Figure 1:
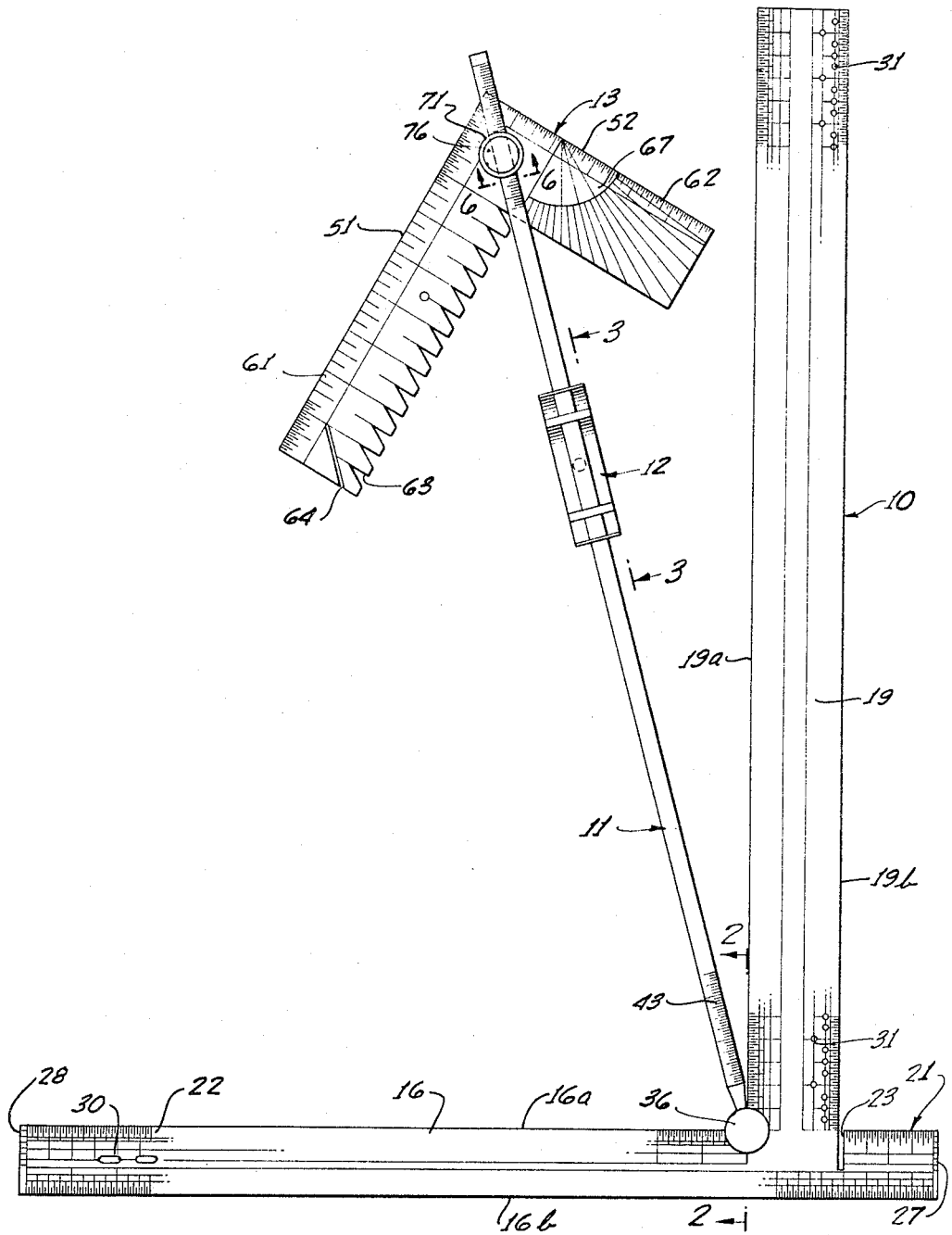
FIG. 1 is a plan view of a combination layout tool in accordance with the present invention.

The combination layout tool forming the present invention is more clearly illustrated in FIG. 1. The basic components of the tool including a T or T-square 10, a radius arm 11 pivotally connected to the T-square 10, a scribe 12 slideably but non-rotatably mounted on the radius arm 11 and an auxiliary square 13 mounted on the outer end of the radius arm for rotation about and movement therealong.

Figure 4:
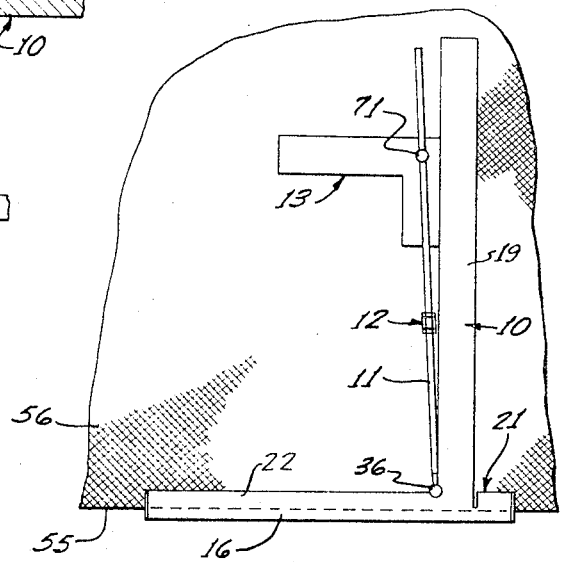
FIG. 4 is a schematic representation of the present invention as it might be used in making a layout on a piece of sheet metal.

The exemplary tool is constructed to work off of a horizontal edge of the sheet metal (as illustrated generally in FIG. 4). As a result, the horizontal or guide arm 16 of the T 10 has a depending guide shoulder 17 (see FIG. 2), which extends below the lower surface of arm 16 to bear against the lower edge of a piece of sheet metal upon which a layout is being made.

The vertical arm 19, which forms a right angle with guide arm 16, is somewhat longer than horizontal arm 16. The right end 21 (with respect to the orientation of FIG. 1) of the guide arm 16 of the T is much shorter than the left section 22 and has a vertical slot 23 formed therein which registers with the outer edge 19b of the vertical arm 19 and terminates adjacent the depending shoulder 17. This permits a line or impression to be inscribed completely to the edge of the sheet metal that acts as the guide during a layout operation.

The ends 21 and 22 of the T are provided with a series of scale markings 27 and 28, respectively, starting at zero at the upper edge 16a of arm 16 and extending downwardly to a terminal point coincident the shoulder 17. These permit a flange or lip of preselected width to be marked off on the sheet metal. In normal use, the inner edge 16a is used as a reference which provides a flange or lip equal to the depth of slot 23. In some cases, however, it may be desirable to provide a smaller flange and the scales 27 and 28 permit this to be done easily and efficiently.

In addition to the arm 16 and 19 having a plurality of scales formed on their inner and outer edges which terminate at the junction of the arms, there are provided a series of slots 30 along the guide arm 16 to permit a benchman in using the tool to see other scribe marks on the pattern that are temporarily under the arm 16. There are also provided a series of spaced-apart apertures 31 in the vertical arm 19 to permit spacing out rivet or screw locations.

Figure 2:
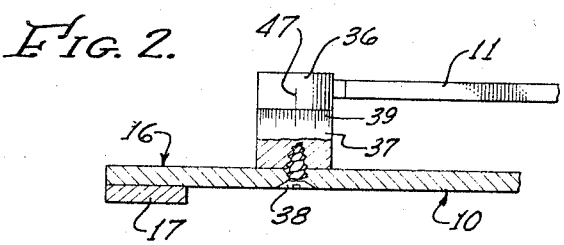
FIG. 2 is a section taken along line 2—2 of FIG. 1 to illustrate the pivot point for the radius arm and the angular index associated therewith.

The radius or compass arm 11 is square in cross-section and affixed at its lower end to a hub 36 which is rotatably mounted on an upstanding circular shoulder 37. The shoulder 37 is mounted at the apex of the T-square by screw means 38 as illustrated in FIG. 2. The hub 36 is rotatably mounted on the shoulder 37 to permit the radius arm to be moved between horizontal arm 16 and vertical arm 19 of the T. An angular scale 39 is formed about the periphery of upstanding shoulder 37 and an index line 41 is provided on the hub 36 to permit the instant angular position of radius arm 11 to be determined with respect to arms 16 and 19. Means (not shown) could also be provided to lock the radius arm in any given position. In the illustrative embodiment of the present invention, however, the radius arm 11 is freely rotatable with respect to the arms 16, 19 of the T-square 10.

A scale 43 is formed along the upper surface of the radius arm 11 and, along with the scales formed on the inner edges 16a and 19a of the T-square arms, has its terminal point or zero at the apex of the arms. This permits the use of radius arm 11 in conjunction with arms 16 and 19 for various triangulation problems encountered in sheet metal layout work.

Figure 3:
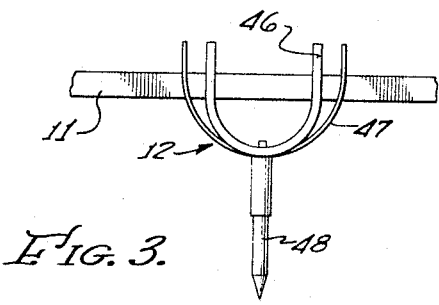
FIG. 3 is a section taken along line 3—3 of FIG. 1 to illustrate an exemplary scribe forming part of the present invention.

While a variety of slidable but non-rotatable scribes may be used in conjunction with the combination tool, FIG. 3 illustrates a trammel disclosed in Patent 2,608,766, issued to J. W. Thein on September 2, 1952. The exemplary trammel includes a U-shaped support member 46 apertured to receive and ride on radius arm 11. A generally U-shaped resilient member 47 is joined to the support member 46 at the bights of the U's. The legs of member 47 are apertured to receive the radius arm 11 and the resiliency of member 47 urges its legs outwardly with respect to the support member 46. A scribe 48 is affixed to the common junction of support member 46 and the resilient member 47 to permit the scribing of arcs. In order to move the trammel 12 along the radius arm 11, the ends of the resilient member 47 are held compressed adjacent the legs of support member 46. Upon release of the ends of resilient member 47, the edges defining the apertures therein grip the radius arm 11 and prevent further movement. A more complete understanding of the trammel illustrated can be obtained from the patent. It may also be desirable to have member 48 removable or retractable during the times when the scribe is not actually being used.

Figure 5:
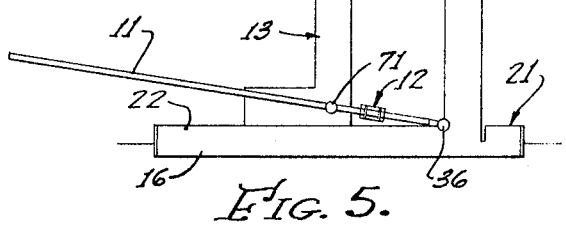
FIG. 5 is a schematic representation of the present invention illustrating the use of the auxiliary scale in conjunction with the guide arm of the T-square; and, FIG. 6 is a section taken along line 6—6 of FIG. 1 to illustrate the means supporting the auxiliary square on the radius arm.

The auxiliary square 13 has a pair of legs 51 and 52 which are joined at a right angle. In overall dimensions it is substantially smaller than the angle formed by the arms 16 and 19 of the T. One of the reasons for making the auxiliary square 13 substantially smaller is to permit its use in conjunction with the inner edges 16a and 19a of the T-square 10. Such uses are illustrated in FIGS. 4 and 5.

FIG. 4 illustrates generally the use of the combination layout tool constituting the present invention along a lower edge 55 of a piece of sheet metal 56. Additionally, FIG. 4 depicts the auxiliary square 13 resting against the inner edge 19a of the vertical arm. This permits a series of horizontal lines to be drawn off the edges of arm 51 without moving the T-square 10. A similar use of the auxiliary square 13 in connection with the guide arm 16 is illustrated in FIG. 5 wherein a series of vertical lines may be formed without moving the T-square itself. All of these figures illustrate primarily the versatility of the present combination layout tool.

The auxiliary square 13, besides having a series of scales 61 and 62 along the outer edges of legs 51 and 52, respectively, is provided with a series of notches 63 along the inner edge of leg 51 which permit the spacing out of rivet holes or similar spaced-apart points. There is also provided a 45° slot 64 in the end of leg 51 which is useful in many layout applications. The leg 52 of auxiliary square 13 is also provided with a protractor 67 which has been found particularly useful when using the auxiliary square along the inner edges 16a and 19a of the T-square.

Figure 6:
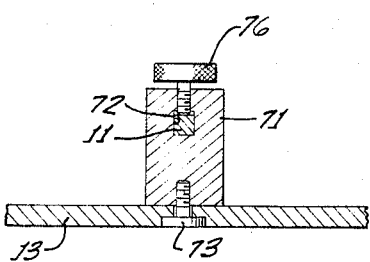

The auxiliary square 13 is mounted on the outer end of the radius arm 11 with two degrees of freedom by upstanding shoulder 71. FIG. 6 is a section view of the means of attachment. There is an aperture 72 in shoulder 71 to receive arm 11, and shoulder 71 is rotatably mounted on the square 13 by an inset screw 73 which lies interior of the auxiliary square 13. A thumb screw 76 is threaded through the top of shoulder 71 to bear against radius arm 11 when it is desirable to lock the auxiliary square 13 in a fixed position.

While the combination layout tool forming the present invention has been described in connection with an exemplary embodiment, it should be apparent to those skilled in the art that certain modifications and changes can be made without departing from the spirit and scope of the invention. For this reason, the invention should only be limited to the extent of the claims.

What is claimed is:

1. A combination layout tool comprising, in combination:
 (a) a base member;
 (b) an upright arm member perpendicularly and integrally mounted on said base member to form a first square;

(c) each of said members having parallel inner and outer edges which intersect at right angles with an apex at the intersection of said inner edges and each member having at least one scale thereon;

(d) a rotating arm member pivoted coincident with said apex and having a scale with zero indexed at said apex formed thereon;

(e) a second relatively small square slideably and movably connected to said rotating arm and having scaled inner and outer edges with protracting means and spacing means provided thereon;

(f) means to read out the interior angle between said rotating arm member and said base member;

(g) marking means slideable on said rotating arm for positioning it at different predetermined scale positions along the arm intermediate said first and said second squares;

(h) guide means associated with said first square to permit it to move along a work piece; and, (i) a measuring aperture formed in said base member adjacent said upright arm member and extending across said base member to said guide means.

2. A combination layout tool in accordance with claim 1 wherein a plurality of apertures are formed along said base member and said upright arm member to permit marking off scalar quantities therealong.

3. In a multipurpose tool for sheet metal layout work, the combination of:

(a) a T-square having a horizontal member with a depending guide shoulder and vertical arm;

(b) said horizontal member and vertical arm having a series of scales marked thereon whose origins are indexed at the intersection of said member and said arm;

(c) a compass arm pivotally mounted at one end at the junction of the interior edges of said horizontal member and said vertical arm for angular rotation;

(d) said compass arm having a scale inscribed thereon which has its indexed zero overlying the pivotal axis for said compass arm;

(e) a trammel including a scribe slideably but non-rotatably supported on said compass arm to permit an arc of a preselected radius to be scribed in the area bounded by said horizontal member and said vertical arm;

(f) a degree index associated with the pivotal mounting for said compass arm to provide a visual readout of the angle between said compass arm and said vertical arm;

(g) a two-sided square having a plurality of commonly indexed layout scales and indentations formed therein;

(h) means pivotally and slideably mounting said square on said compass arm in coplanar relationship with said T-square;

(i) the sides of said square being substantially shorter than either of said horizontal member and said vertical arm so that said square may be used relatively close to the pivotal support for said compass arm without contacting said arms of said T-square; and, (j) means operable to hold said compass arm, said square and said marking means in preselected positions with respect to said T-square.

4. A combination layout tool comprising:

(a) a right angle member having horizontal and vertical coplanar arms;

(b) said right angle member having scalar indicia thereon and having one horizontal stub arm extending past the junction of its arms;

(c) said stub arm having a vertical aperture therein which is aligned with the outer edge of the vertical arm;

(d) a rotatable arm pivotally mounted at the apex of the interior angle of said right angle member and having scalar indicia thereon corresponding with the scalar indicia of said right angle member;

(e) an auxiliary right angle member having coplanar arms associated with said rotatable arm for manipulation and use within the area defined by the arms of said right angle member; and (f) a horizontal guide shoulder depending from said horizontal arm at the point of termination of said vertical aperture to act as a guide for the horizontal movement of said layout tool.

5. A combination layout tool comprising, in combination:

(a) a base member;

(b) an upright arm member perpendicularly and integrally mounted on said base member to form a first square;

(c) each of said members having parallel inner and outer edges which intersect at right angles with an apex at the intersection of said inner edges and each member having at least one scale thereon;

(d) a rotating arm member pivoted coincident with said apex and having a scale with zero indexed at said apex formed thereon;

(e) a second relatively small square slideably and movably connected to said rotating arm and having scaled edges;

(f) means to read out the interior angle between said rotating arm member and said base member;

(g) marking means slideable on said rotating arm for positioning it at different predetermined scale positions along the arm intermediate said first and said second squares; and, (h) guide means associated with said first square to permit it to move along a work piece.

References Cited by the Examiner

UNITED STATES PATENTS

| 175,416 | 3/1876 | Bustin | 33—93 |
| 230,975 | 8/1880 | Walters | 33—43 |
| 257,515 | 5/1882 | Pope | 33—113 |
| 345,196 | 7/1886 | Vose | 33—43 |
| 581,437 | 4/1897 | Silliker | 33—43 |
| 991,693 | 5/1911 | Brown | 33—27 |

FOREIGN PATENTS

| 276,380 | 7/1914 | Germany. |
| 20,044 | 1903 | Great Britain. |
| 17,115 | 1907 | Great Britain. |
| 254,831 | 1/1949 | Switzerland. |

LEONARD FORMAN, *Primary Examiner.*

ISAAC LISANN, *Examiner.*

H. N. HAROIAN, *Assistant Examiner.*